United States Patent [19]
Talbot

[11] Patent Number: 6,163,294
[45] Date of Patent: Dec. 19, 2000

[54] TIME-TAGGING ELECTRONIC DISTANCE MEASUREMENT INSTRUMENT MEASUREMENTS TO SERVE AS LEGAL EVIDENCE OF CALIBRATION

[75] Inventor: Nicholas C. Talbot, Ashburton, Australia

[73] Assignee: Trimble Navigation Limited, Sunnyvale, Calif.

[21] Appl. No.: 09/151,372

[22] Filed: Sep. 10, 1998

[51] Int. Cl.[7] ............... G01S 5/02; H04B 7/185; G01C 5/00; G01C 3/00

[52] U.S. Cl. ............ 342/357.06; 342/127; 342/458; 33/292; 356/3

[58] Field of Search .............. 342/357.17, 357.06, 342/357.08, 357.09, 118, 450, 357.03, 127, 458; 33/292; 356/3

[56] References Cited

U.S. PATENT DOCUMENTS

| | | | |
|---|---|---|---|
| 4,717,251 | 1/1988 | Wells et al. | 356/4.06 |
| 5,155,490 | 10/1992 | Spradley, Jr. et al. | 342/357.03 |
| 5,233,357 | 8/1993 | Ingensand et al. | 342/352 |
| 5,471,218 | 11/1995 | Talbot et al. | 342/357.03 |
| 5,689,431 | 11/1997 | Rudow et al. | 342/457 |

OTHER PUBLICATIONS

Rueger, J.M., Electronic Distance Measurement–An Introduction, Springer Verlag, Berlin, third edition, 1990. P. 31–47.

*Primary Examiner*—Thomas H. Tarcza
*Assistant Examiner*—Fred H. Mull
*Attorney, Agent, or Firm*—Thomas E. Schatzel; Law Offices of Thomas E. Schatzel, A Prof. Corp.

[57] ABSTRACT

A combined satellite positioning and electro-optical total station system including a satellite navigation receiver and a reference oscillator with a reference frequency output that can be related to precision time standards obtained from orbiting navigation-satellite transmissions. Such time standards are output by the satellite navigation receiver and are highly precise. An electronic distance meter (EDM) is included and has an EDM-transmitter for launching an out-bound signal to a distant target, and an EDM-receiver for receiving a reflected signal from the distant target. A phase measurement device is connected to the reference oscillator, and also to both the EDM-transmitter and EDM-receiver. It provides for a measurement of the difference in the number of cycles of the reference frequency between the out-bound signal and the reflected signal. A post-processor is connected, such as by radio link or floppy disk, to receive the measurement of the difference in the number of cycles of the reference frequency and the precision time standards obtained from orbiting navigation-satellite transmissions. Post-processing is then able to relate the corresponding measurements and time standards such that a distance-to-target measurement can ultimately be computed. Therefore routine calibration of the EDM is unnecessary. The measurement of the difference in the number of cycles of the reference frequency is time-tagged and stored for later retrieval to construct a time-ordered log. The precision time standards obtained from the orbiting navigation-satellite transmissions are similarly time-tagged and stored. Thus a series of distance-to-target measurement can be computed according to the order they were originally collected in the field by the EDM, as might be necessary in a legal inquiry.

6 Claims, 5 Drawing Sheets

TIME-TAGGING ELECTRONIC DISTANCE MEASUREMENT INSTRUMENT MEASUREMENTS TO SERVE AS LEGAL EVIDENCE OF CALIBRATION

BACKGROUND OF THE INVENTION

1. Field of the Invention

The invention relates generally to surveying instruments and more particularly to devices and methods for using reference signals from a satellite navigation receiver to automatically and precisely calibrate electronic distance measurement instruments, and for servo-driving the telescopes in electro-optical total stations.

2. Description of the Prior Art

Electronic distance measurement (EDM) equipment became commercially available after World War-II and has since become very important to the surveying, navigation and scientific communities. Since the introduction of EDM, the instrument size and power consumption have been reduced, and the precision and speed of measurement have been improved. Because the miniaturization of EDM equipment became possible, it made good sense to mount EDM's on theodolites which have telescopes that can precisely sight a horizontal and vertical angle to a target. Such combinations are electro-optical hybrids called "total stations".

Combination electronic theodolite and EDM instruments allow surveyors to find the "space vector" from the instrument to a distant target. When a total station is connected to an electronic data recorder, field information can be quickly gathered and used to generate maps and plans in the office.

Flexible tapes, leveling staves, electro-optical distance meters, and other surveying equipment are calibrated to a legal standard and calibration certificates are issued, e.g., a "Regulation 80 Certificate", as is issued in Western Australia. Such calibration is especially important where a legal purpose is in mind, e.g., an inspection to enforce a law or to be used as evidence in a court action. A flexible tape calibration laboratory in Midland is registered by the National Standards Commission of Australia for calibration of 1–100 meter lengths.

There are two certified baselines in Western Australia against which EDM instruments can be calibrated. The aim of EDM calibration is to ensure that it measures in accordance with the internationally recognized definition of length, as set forth by the Conference Generale des Poids et Measures (CGPM—the General Conference on Weights and Measures). Other governments in the world provide similar baselines and certification opportunities. When a Regulation 80 Certificate is required for the purpose of legal traceability to the Australian Standard for length, the EDM instrument is submitted to the Surveyor General for calibration. The Director of the Mapping & Survey Division is the verifying authority for length and is appointed by the National Standards Commission. The Surveyor General now provides a software application program, called BASELINE, to assist surveyors with their regular calibrations of EDM instruments.

The accuracy of electronic distance measurement equipment is derived from an internal reference frequency source, e.g., a crystal oscillator. But such crystal oscillators can drift over time and with age. Exposure to extreme environments can also upset delicate calibrations of the reference frequency source, both short term and long term. Therefore, EDM equipment should be regularly calibrated by using it to measure a known length.

Long-range electronic distance meters, e.g., ranges over five kilometers, typically use microwave signals for measurement. Short range electronic distance meters often use infrared light. See, Rueger, J. M., *Electronic Distance Measurement-An Introduction*, Springer Verlag, Berlin, third edition, 1990. Both the long-range and short-range EDM's use pulse or phase comparison methods to determine the distance between instrument and a remote target. However, the phase comparison method is more commonly used for survey instruments.

The pulse technique is based on timing the signal travel time to and from a distant reflector. The velocity of the signal is assumed to be known. For phase comparison, the phase difference of signals is observed at several frequencies. The unambiguous distance between the target and the instrument is resolved using phase difference observations. But in all cases, the basis for measurement precision depends on the accuracy of the stand-alone reference frequency source.

In U.S. Pat. No. 5,471,218, issued Nov. 28, 1995, Nicholas C. Talbot and Mark Nichols, described a combined satellite positioning/electro-optical total station system. One candidate satellite positioning system that can be used effectively is the Global Positioning System (GPS) operated by the United States. Such patent is incorporated herein by reference.

The combined satellite positioning/electro-optical total station system allows rapid instrument orientation and positioning in the field. Another integrated surveying system that combines electro-optical instrumentation with a satellite position measuring system is described by Ingensand, et al., in U.S. Pat. No. 5,233,357.

EDM measurements ultimately rely on the calibration of the instrument. Such calibrations can drift over time, temperature, and mechanical abuse. In general, the law in various jurisdictions specifies a maximum period that an EDM can be operated by a surveyor before its calibration must be certified again. It can also be advantageous in various legal situations where the question is raised on the survey method if the raw measurements are kept in a time-ordered log so that reconstructions of the survey can be performed.

SUMMARY OF THE PRESENT INVENTION

It is therefore an object of the present invention to provide a combined satellite positioning and electro-optical total station system in which the calibration or oscillator scale errors of an electronic distance measurement are automatically and precisely determined and recorded in real time and made a part of the permanent survey record.

It is another object of the present invention to provide a combined satellite positioning and electro-optical total station system that keeps an electronic time-ordered log of a particular series of survey measurements.

Briefly, a combined satellite positioning and electro-optical total station system embodiment of the present invention includes a satellite navigation receiver and a reference oscillator with a reference frequency output that can be related to precision time standards obtained from orbiting navigation-satellite transmissions. Such time standards are output by the satellite navigation receiver and are highly precise. An electronic distance meter (EDM) is included and has an EDM-transmitter for launching an out-bound signal to a distant target, and an EDM-receiver for receiving a reflected signal from the distant target. A phase measurement device is connected to the reference oscillator, and also to both the EDM-transmitter and EDM-receiver. It provides for a measurement of the difference in the number of cycles of the reference frequency between the out-bound signal and the reflected signal. A post-processor is connected, such as by radio link or floppy disk, to receive the measurement of the difference in the number of cycles of the reference frequency and the precision time standards obtained from orbiting navigation-satellite transmissions. Post-processing is then able to relate the corresponding measurements and time standards such that a distance-to-target measurement can ultimately be computed. Therefore routine calibration of the EDM is unnecessary. The measurement of the difference in the number of cycles of the reference frequency is time-tagged and stored for later retrieval to construct a time-ordered log. The precision time standards obtained from the orbiting navigation-satellite transmissions are similarly time-tagged and stored. An advantage of the present invention is that a combined satellite positioning and electro-optical total station system is provided that includes an electronic distance meter that requires no calibration per se.

Another advantage of the present invention is that a combined satellite positioning and electro-optical total station system is provided in which a series of distance-to-target measurement can be computed according to the order they were originally collected in the field by the EDM, as might be necessary in a legal inquiry.

These and other objects and advantages of the present invention will no doubt become obvious to those of ordinary skill in the art after having read the following detailed description of the preferred embodiment that is illustrated in the drawing figures.

IN THE DRAWINGS

Figure 7:
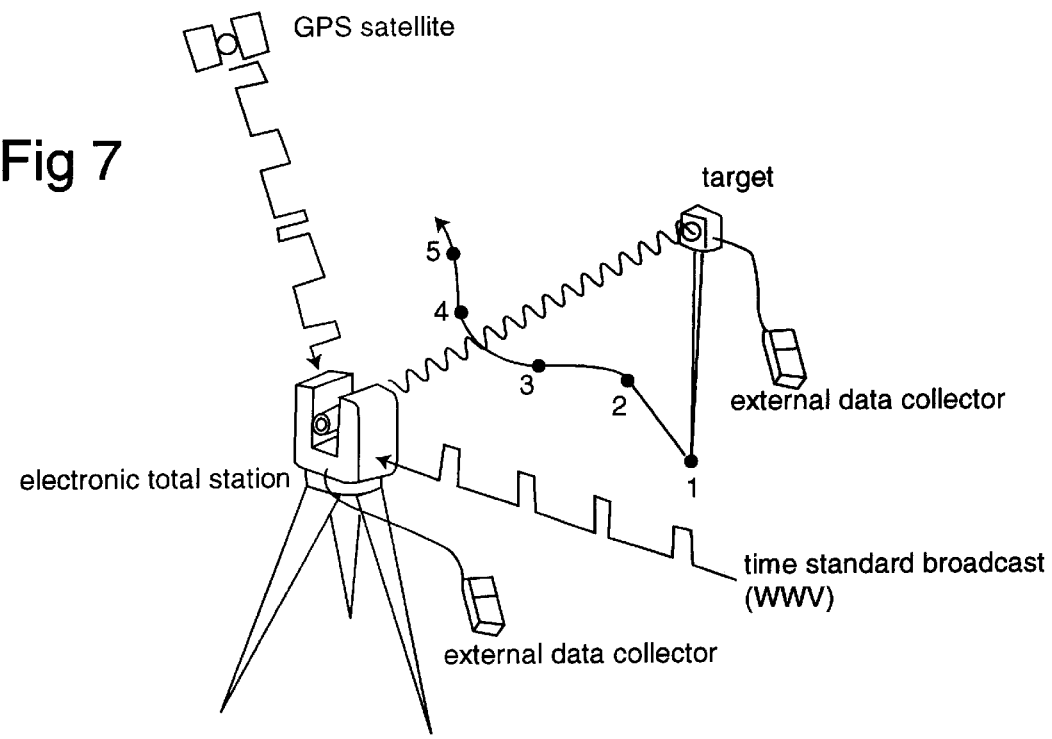
Figure 8:
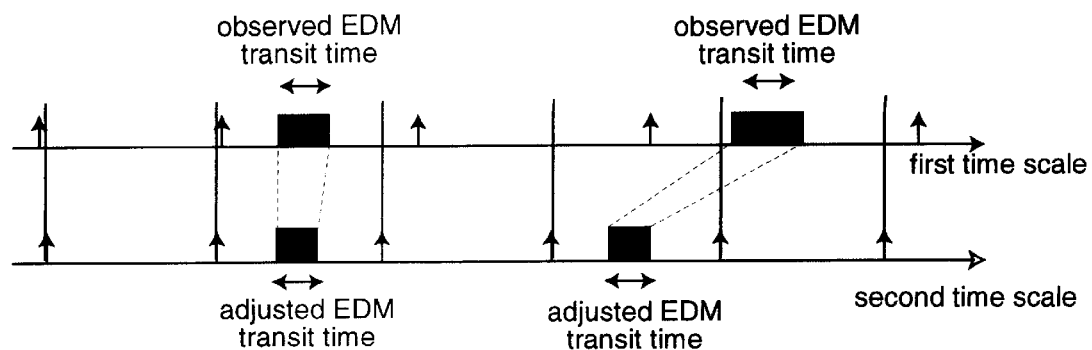

FIG. 7 is a diagram representing the signals available to a total-station embodiment of the present invention. The GPS satellite and/or WWV time standard broadcasts are used to calibrate the time-of-flight measurements of a signal reflected from a target at five various positions; and FIG. 8 is a graph comparing the observed EDM transit times given a particular EDM's oscillator as a reference, and a truer, "adjusted" EDM transit time for each of several discrete measurements.

DETAILED DESCRIPTION OF THE PREFERRED EMBODIMENT

Figure 1:
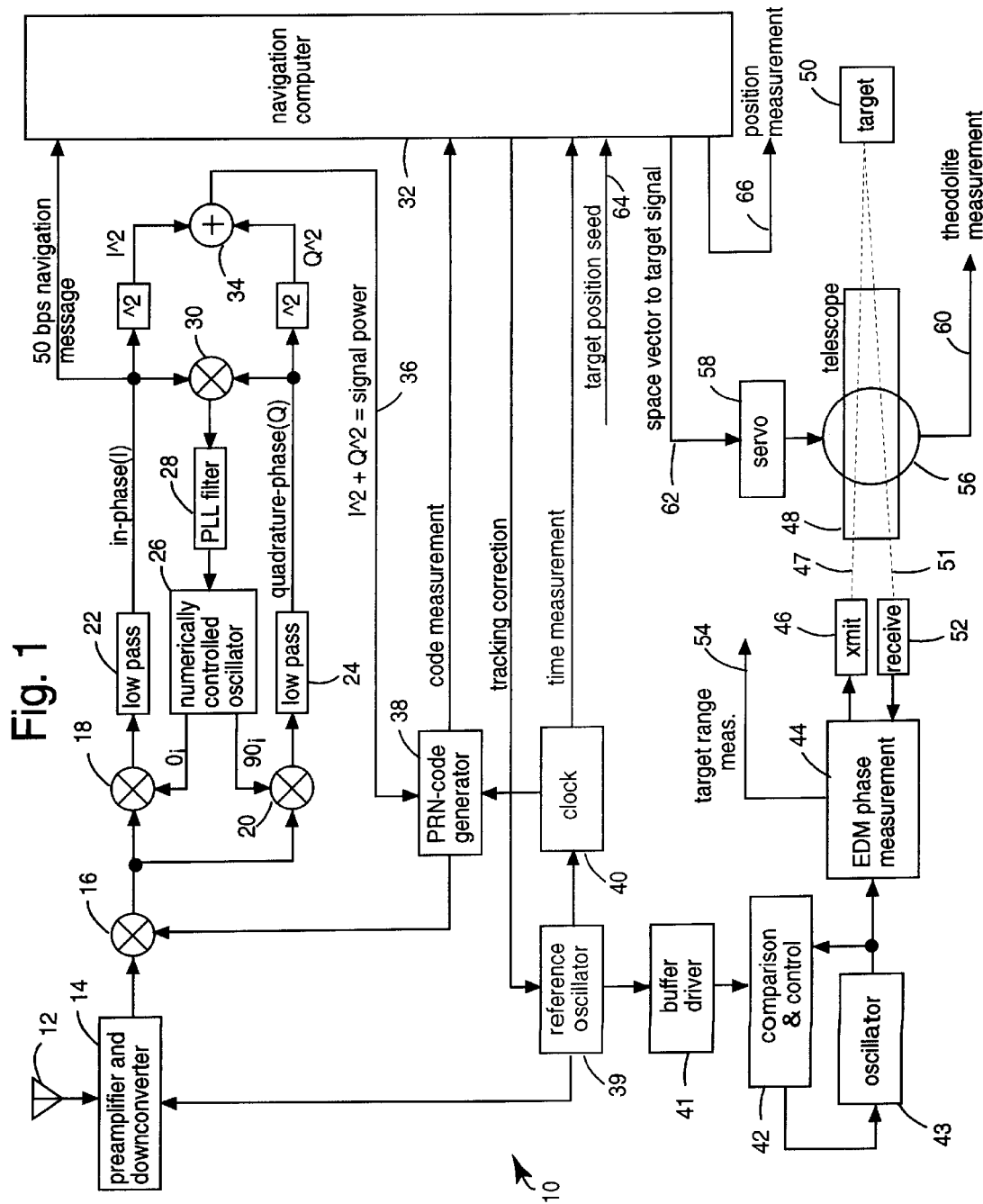
FIG. 1 is a functional block diagram of combined satellite positioning and electro-optical total station system embodiment of the present invention.

FIG. 1 illustrates a combined satellite positioning and electro-optical total station system embodiment of the present invention, referred to herein by the general reference numeral 10. A global positioning system (GPS) part of the system 10 includes a microwave patch antenna 12 for receiving L-band transmissions from orbiting GPS satellites, a preamplifier and downconverter 14, a code mixer 16, an in-phase carrier mixer 18, and a quadrature phase carrier mixer 20. The carrier mixer outputs are each sent to low pass filters 22 and 24. A numerically controlled oscillator (NCO) 26 is driven by a bi-phase locked loop filter 28 and a multiplier 30. The NCO 26 produces a corrected frequency output that tracks the GPS-satellite carrier being tracked plus any Doppler effects.

The goal here is to realize a combined satellite positioning and electro-optical total station system that includes a satellite navigation receiver and a reference oscillator with a reference frequency output that can be related to precision time standards obtained from orbiting navigation-satellite transmissions. Such time standards are output by the satellite navigation receiver and are highly precise. An electronic distance meter (EDM) is included and has an EDM-transmitter for launching an out-bound signal to a distant target, and an EDM-receiver for receiving a reflected signal from the distant target.

In embodiments of the present invention, a phase measurement device is connected to the reference oscillator, and also to both the EDM-transmitter and EDM-receiver. It provides for a measurement of the difference in the number of cycles of the reference frequency between the out-bound signal and the reflected signal. A post-processor is connected, such as by radio link or floppy disk, to receive the measurement of the difference in the number of cycles of the reference frequency and the precision time standards obtained from orbiting navigation-satellite transmissions. Using disk storage allows legal records to be achieved.

Post-processing is then used to relate the corresponding measurements and time standards such that a distance-to-target measurement can ultimately be computed. Therefore routine calibration of the EDM is unnecessary. The measurement of the difference in the number of cycles of the reference frequency is time-tagged and stored for later retrieval to construct a time-ordered log. The precision time standards obtained from the orbiting navigation-satellite transmissions are similarly time-tagged and stored.

The low pass filter 22 produces a fifty Hertz navigation message that is input to a navigation computer 32. An adder 34 combines a squared in-phase signal ($I^2$) and a squared quadrature-phase signal ($Q^2$) to produce a signal-power signal ($I^2+Q^2$) 36 that is proportional in magnitude to the despreading code correlation. The $I^2+Q^2$ signal 36 is used to control the code-phase of a PRN-code generator 38. A GPS-master reference oscillator 39 receives correction signals from the navigation computer 32 that maintain the satellite tracking. A precision reference frequency is then made available to drive a clock 40 and the downconverter 14. A buffer driver 41 allows the reference frequency to be brought external from the GPS portion and isolates the reference oscillator from external load variations.

Figure 2:
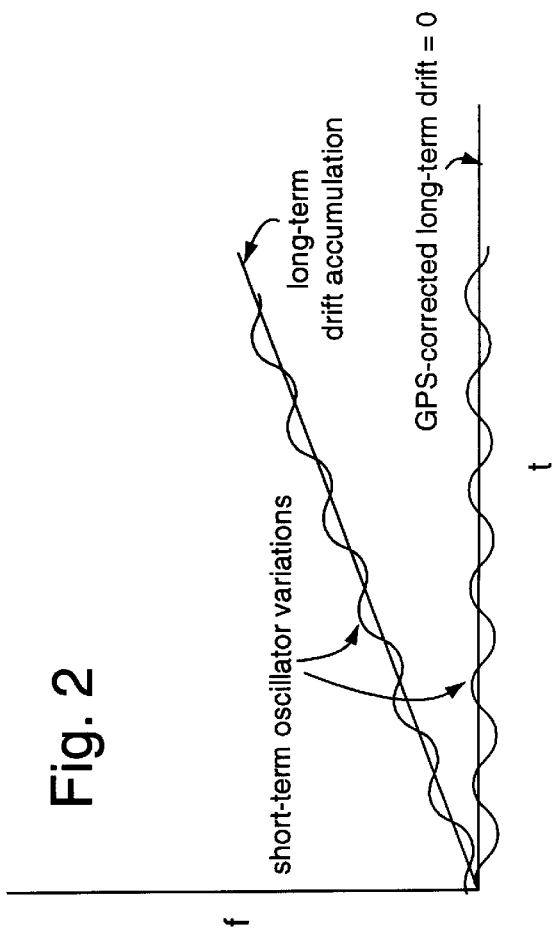
FIG. 2 represents a plot of short-term oscillator drift and the effect of the present invention to correct long-term oscillator drift.

FIG. 2 represents a plot of short-term oscillator drift and the effect of the present invention to correct long-term oscillator drift.

Referring again to FIG. 1, code measurement, time measurement, and the navigation message are used by the navigation computer 32 to compute the current three-dimensional position of the system 10. The GPS system time, e.g., in Universal Time Coordinated (UTC), is also determined by the navigation computer 32. Such UTC is typically accurate in absolute terms to better than one hundred nanoseconds.

Once the location of the instrument station is determined either from GPS or other means, a minimum of only one satellite is required to calibrate the time base of the instrument. The accuracy of the instrument location should be known to better than thirty meters in order to transfer GPS time to 100 nanoseconds. This time frequency transfer can be achieved with sufficient accuracy if the location of the instrument is only known to 100 meters.

An electronic distance meter (EDM) part of the system 10 includes a phase comparator and charge pump 42 that servo controls a slave oscillator 43. When the GPS navigation receiver part is tracking enough satellites to obtain a position fix, a highly accurate estimate of time and local oscillator frequency is available and used to precisely fix the operating frequency of oscillator 43. Inexpensive crystal oscillators can be used throughout and for the local oscillator in the GPS receiver, and their absolute frequency accuracy is relatively unimportant because once signal lock is obtained with the GPS satellites, phase locked loops can be used to establish a precision frequency reference that is almost as accurate as the cesium-rubidium clocks in the GPS system.

An EDM phase measurement subsystem 44 is connected to a transmitter 46 that sends an out-bound signal 47 through a telescope 48 to a distant target 50. The target 50 may include a prism corner-cube reflector, or active repeater for microwave EDM, to return an in-bound signal 51. The signals 47 and 51 may be infrared or other laser light, or microwave signals. The EDM phase measurement subsystem 44 can conduct either pulse time-of-flight or carrier phase measurements to determine the line-of-sight distance to the target 50. Conventional methods and equipment can be used to do this. A target range measurement 54 is output that can be presented on a local display, recorded electronically, or transmitted to a user that is at the target and is moving the target around to mark a particular range from the system 10 location.

A theodolite part of the system 10 includes the telescope 48 mounted to an angle measurement instrument 56 connected to a servo actuator 58. A theodolite measurement 60 includes an elevation and azimuth output that can be presented on a local display, recorded electronically, or transmitted to a user that is at the target 50 and is moving the target around to mark a particular vector angle from the system 10 location. A space vector to target signal 62 is computed by the navigation computer 32 from a target position seed input 64.

The navigation computer 32 is able to compute the current position of the system 10 and outputs this as a position estimate 66. From this position estimate, it is possible to determine the altitude and azimuth vector to the target 50. The space vector to target signal 62 commands the servo 58 to move the telescope 48 so that it is roughly pointed at the target 50. A conventional search and tracking mechanism can then be used to find and keep the target 50 locked in. For example, the Geodimeter SYSTEM-500 is a commercially marketed system that is a servo-driven survey instrument in an automatically pointed electro-optical total station. The target location seed 64 can be computed using differential satellite position calculations relative to the EDM reference station.

Figure 3:
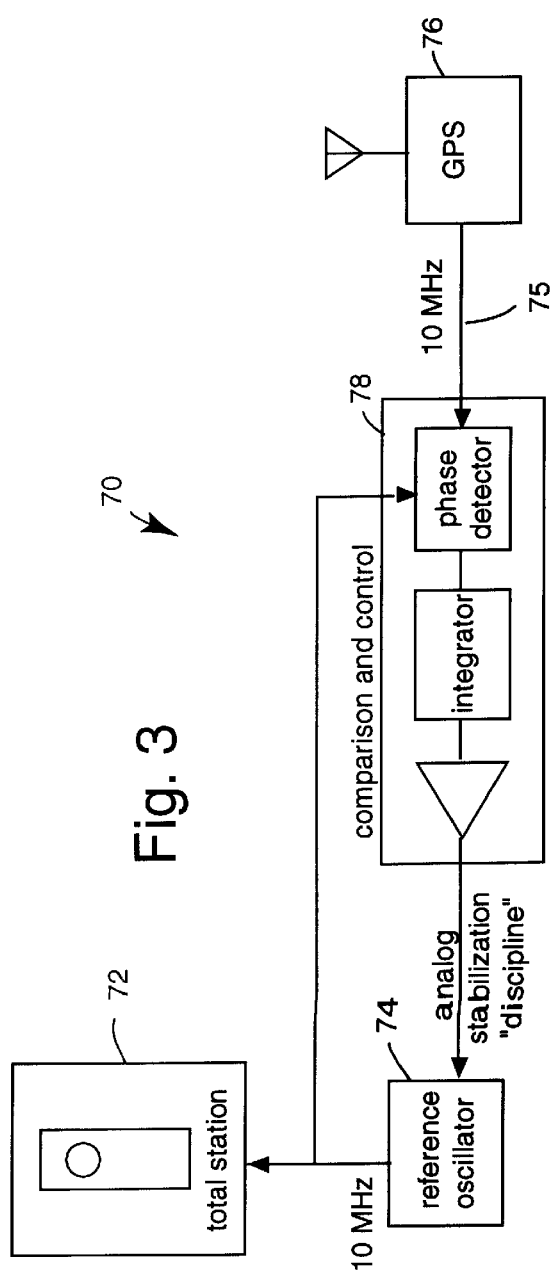
FIG. 3 is a functional block diagram of a total station which uses an external reference oscillator that is stabilized by a timing signal obtained from a GPS receiver.

FIG. 3 illustrates a system 70 in which a total station 72 inputs a 10.00 MHz precision reference oscillator 74 that is stabilized by a timing signal 75 derived from a GPS receiver 76. For example, GPS receivers marketed by Trimble Navigation Limited (Sunnyvale, Calif.) output a utility one-pulse-per-second (1PPS) that can be used by a phase comparison and frequency control circuit 78 to make minor corrections in the operating frequency of oscillator 74. Such reference oscillator may be a voltage-controlled oscillator (VCO) or a numeric controlled oscillator (NCO) type. For the VCO type, the control signal from circuit 78 is a variable analog voltage or current. For the NCO type, the control signal from circuit 78 is a digital value.

Figure 4:
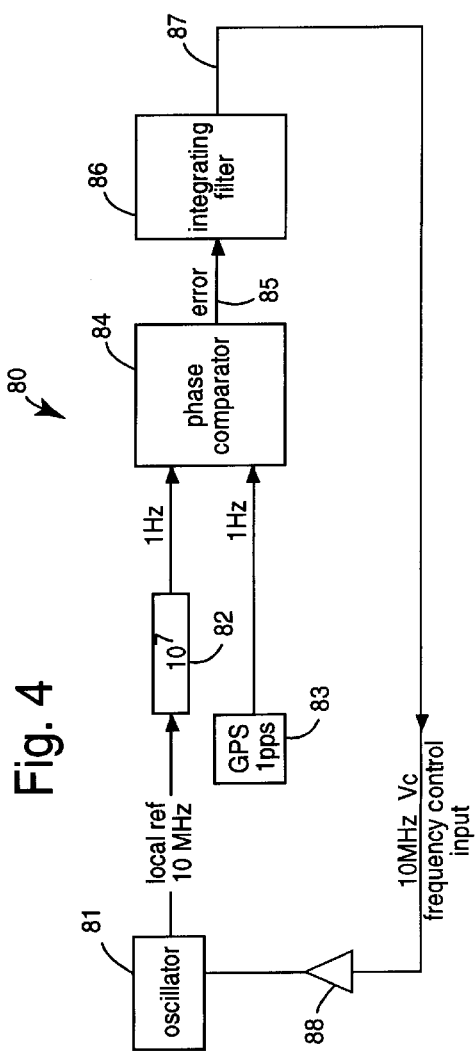
FIG. 4 is a functional block diagram of a 10 MHz reference oscillator in a generic product that is locally stabilized or disciplined by a GPS receiver with zero-crossing comparisons at one pulse per second.

FIG. 4 shows a precision reference system 80 in which a 10.00 MHz reference oscillator 81 is a generic product that is stabilized or disciplined by zero-crossing comparisons at one pulse per second. A divider 82 is used to reduce the output of the oscillator 81 to 1.00 Hz. A local GPS receiver source 83 provides a reference 1.00 Hz signal that is exceedingly precise and stable because it is derived from the atomic clocks used in the GPS system time standards. A phase comparator 84 provides an error signal 85 that is applied to an integrating filter 86 that drives the static phase error to zero for synchronization. A control signal 87 is returned via a buffer 88 to the oscillator 81. The overall effect is to reduce the accumulation of errors over the long term to an average of zero, as in FIG. 2.

Figure 5:
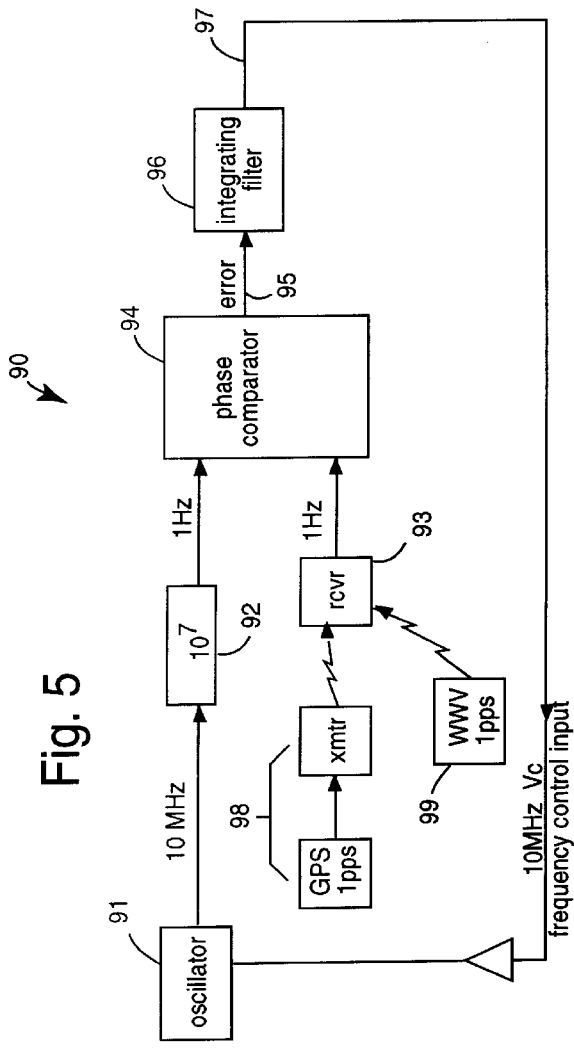
FIG. 5 is a functional block diagram of a 10 MHz reference oscillator in a generic product that is remotely stabilized or disciplined by radio transmissions it receives from either a GPS receiver or government time-standard broadcasts such as from WWV.

FIG. 5 shows an alternative embodiment of a precision reference system 90 in which a 10.00 MHz reference oscillator 91 within an otherwise standard commercial product is stabilized or disciplined, e.g., with one-pulse-per-second signals. A divider 92 reduces the 10.00 MHz output of the oscillator 91 all the way down to 1.00 Hz. A radio receiver 93 is tuned to a 1.00 Hz remotely transmitted signal that is exceedingly precise and stable. A phase comparator 94 provides an error signal 95 that is applied to an integrating filter 96 that drives the static phase error to zero for synchronization. A control signal 97 is returned to closed-loop lock in the frequency of operation of oscillator 91. A GPS receiver and radio transmitter combination 98 or a government time-standard broadcast transmitter 99, e.g., WWV, are examples of sources used by the receiver 93. Such a configuration would be helpful in the total station system 10 of FIG. 1 in areas with intermittent GPS coverage due to tree canopies or urban-canyon effects. For example, receiver 93 could comprise a commercial product such as is marketed by ESE (El Segundo, Calif. 90245), as the ES-180A master clock. The ES-180A receives and synchronizes to time data broadcast from the NIST via short-wave radio, WWV in Fort Collins, Colo., and WWVH in Hawaii, and provides a time-code output (TC89), ASCII time output (queried RS232), and a 1-PPS (pulse-per-second) output.

Time bases that use radio transmissions from the WWV and WWVH stations operated by the United States Government typically provide a usable received accuracy of one part in ten million for frequency, and about one millisecond for timing. The frequencies as transmitted, however, are accurate to one part in a billion because they are based on the primary NIST Frequency Standard and related NIST atomic time scales in Boulder, Colo. The difference in transmitted and received accuracy is due to various propagation effects.

Figure 6:
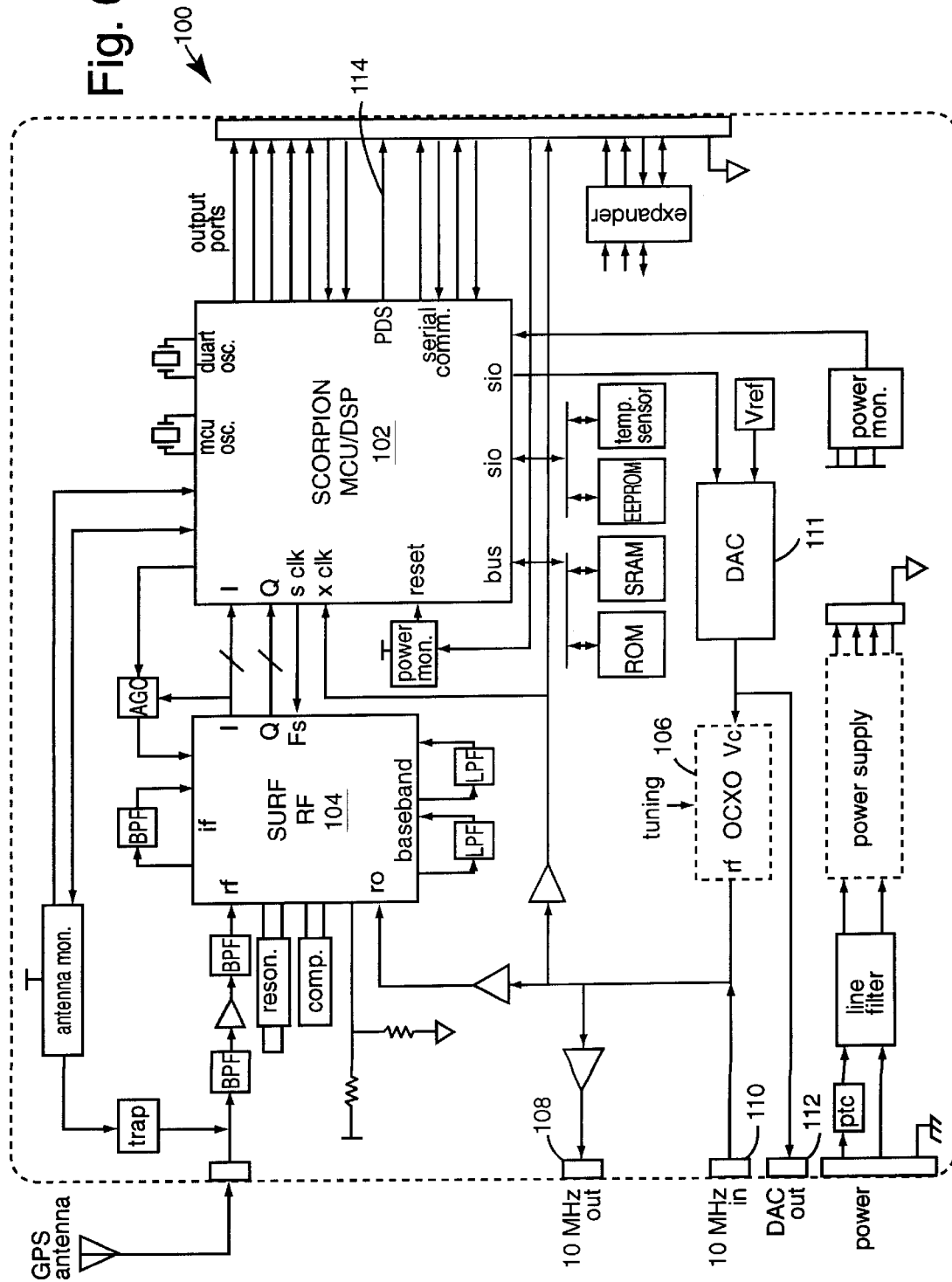
FIG. 6 is a schematic diagram of a GPS receiver useful in the configurations shown in FIGS. 1–3.

FIG. 6 is a schematic diagram of a GPS receiver 100 useful in the configurations shown in FIGS. 1–3. The GPS receiver 100 incorporates a microprocessor control unit (MCU) and digital signal processor (DSP) combination 102, e.g., a "SCORPION" integrated circuit designed by Trimble Navigation Limited (Sunnyvale, Calif.). The radio frequency tuning, downconversion, and digital sampling are done with a radio frequency circuit 104, e.g., a "SURF" integrated circuit designed by Trimble Navigation Limited (Sunnyvale, Calif.). A 10.00 MHz ovenized crystal oscillator (OCXO) 106 provides a precision reference frequency output 108 that can be used by the EDM's and total stations described in FIGS. 1–3. Such reference frequency output 108 has very high frequency precision, both short term and long term. Signals from orbiting navigation satellites are used as references and locked on to by tracking loops within the SCORPION 102 and SURF 104 combination. The MCU/DSP 102 samples the OCXO 106 at its XCLK input and the SURF 104 uses an RO input to generate its local oscillator signals. Alternatively, an external 10.00 MHz source maybe connected to input 110. The SCORPION 102 and SURF 104 combination computes frequency errors and controls a digital to analog converter (DAC) 111. A DAC output 112 is then able to discipline the external 10.00 MHz source. A utility 1PPS output 114 is provided that can be used as shown in FIGS. 2 and 3.

FIG. 7 is a diagram representing the signals available to a total-station embodiment of the present invention. The GPS satellite and/or WWV time standard broadcasts are used to calibrate the time-of-flight measurements of a signal reflected from a target at five various positions.

FIG. 8 is a graph comparing the observed EDM transit times given a particular EDM's oscillator as a reference, e.g., a first time scale. A truer, "adjusted" EDM transit time for each of several discrete measurements is calculated to lie on a second time scale.

FIG. 1 illustrates an electronic total station that observes distance plus horizontal and vertical angles to a remote target-reflector pole. Electronic distance observations involve phase comparison or time-of-flight measurement of an electromagnetic wave emitted at the total station and reflected by the remote target. At least one navigation satellite or time standard broadcast such as WWV is observed and used as a reference for the time base of the electronic distance meter.

Preferably, a log of raw observed angles and distances to a remote target is kept together with the Universal Time Coordinated (UTC) time of each such observation. This makes it possible to later reconstruct the order in which observations were collected, e.g., as in FIG. 7, to point-1, then point-2, then point-3, etc. Such observation times kept in a data log can also form the basis of a legal record. For convenience, the data log may be stored electronically on-board the total station, externally on a data collector, at the prism (reflector) site, or remotely from total station and reflector sites.

The accuracy of electronic distance measurements is intrinsically related to correct time information. An EDM-oscillator typically does not oscillate exactly at its nominal, rated frequency. Thus errors in the EDM-oscillator frequency will translate directly into scale errors in the derived-distance observations.

So in embodiments of the present invention, GPS and/or WWV time inputs are used to drive the EDM oscillator onto an internationally-recognized and correct time scale. Alternatively, both the EDM unit and GPS receiver can share a common oscillator. Typical GPS receivers use software to solve for their clock and frequency offsets relative to the GPS time scale. Thus any EDM measurements based on the shared clock could also be corrected in real-time or later. A combined EDM/GPS system that share a single oscillator will always have GPS time available, so long as satellites are in view. A software correction to all observed EDM transit times can be made by scaling them to the satellite-derived reference time scale.

Method embodiments of the present invention for distance measurements calculate and store frequency and time offsets for an EDM oscillator relative to a GPS time scale, for example. The transit time to a target is measured and stored as a distance. The frequency and time offset for the EDM oscillator, relative to GPS time scale, is calculated and also stored. An interpolated frequency offset is calculated for the measurements taken using the values stored. The observed EDM distance is adjusted by a scale factor which is the frequency offset divided by the nominal frequency. Adjusted EDM distance, time of measurement and scale factor, can thereafter be output.

Much of the detailed description of the preferred embodiments here have treated the EDM oscillator and GPS oscillator as separate and distinct components. For example, the GPS oscillator is assumed to be aligned with GPS time by virtue of tracking GPS satellites, e.g., by hardware means. In many GPS receivers, the clock offset and frequency offset of the GPS receiver oscillator are only calculated relative to the GPS time scale. A "software" approach is then applied that is less expensive and less complicated that uses hardware components to drive the GPS receiver clock onto GPS time.

In EDM/GPS combinations, both components can share the same reference oscillator. In FIG. 1, buffer driver 41 and comparison/control unit 42 would be removed, oscillators 43 and 39 would be reduced to a single component. Such a shared GPS/EDM oscillator, will of course, have a slight rate offset that will cause a scale error in all observed EDM distances. However, a standard calculation in GPS receivers estimates the true oscillator rate. Therefore, all EDM distances can be adjusted in software by a calculated scale factor.

For example, assume that a GPS and EDM combination share the same oscillator. When such an instrument is switched on, it starts to warm up. One would expect the oscillator rate to vary slightly during the warm-up phase, and indeed throughout the day. Suppose a distance is observed with the EDM that reads "1,000.00 Om". Because GPS satellites are being tracked, the oscillator rate error is found to be 0.1 ppm. In other words, the oscillator is running at 10,000,001 Hz, not the nominal 10.000 MHz. No attempt is made to adjust the GPS receiver/EDM oscillator to its nominal frequency of 10 MHz. It is much easier and preferable to correct the observed distance in software, e.g.:

Correct Distance=Observed Distance×S where S=nominal oscillator frequency/true oscillator frequency. For example, Correct Distance=1,000.000×(10,000,000/10,000,001)=999.9999. The corrected distance is displayed and used.

A split GPS/EDM oscillator solution is commercially worthwhile, e.g., GPS retrofits into existing EDM's. In such case it makes sense to actually steer the EDM oscillator onto the correct frequency using special hardware. But for newly developed GPS/EDM systems, it makes much more sense to design in a shared oscillator which is free running, and correct the offsets using software.

Although the present invention has been described in terms of the presently preferred embodiment, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A surveying instrument, comprising:

a satellite navigation receiver for providing a precise and stable reference 1.00 Hz signal derived from an atomic clock;

a phase comparator connected to receive said reference 1.00 Hz signal and a reference-oscillator-sample output, and for providing an error-signal output;

an integrating filter connected to receive said error-signal output, and for driving a static phase error to zero for synchronization with a reference-oscillator-control output;

a reference oscillator with a reference frequency output that can be related to said atomic clock via said reference 1.00 Hz signal, the phase comparator, the integrating filter, and said reference-oscillator-control output;

an electronic distance meter (EDM) having an EDM-transmitter for launching an out-bound signal to a distant target and an EDM-receiver for receiving a reflected signal from said distant target; and an EDM-phase measurement device connected to the reference oscillator and to both said EDM-transmitter and EDM-receiver and providing for a measurement of a count of a number of cycles of said reference frequency output that are generated between a launch of said out-bound signal and a receipt of said reflected signal;

wherein, said count of a number of cycles of said reference frequency output is proportional to a target-range distance to said distant target.

2. The surveying instrument of claim 1, further comprising:

a post-processor connected to receive said measurement of said count of said number of cycles of said reference frequency output, and connected to receive said reference 1.00 Hz signal, and able to relate corresponding measurements and time standards such that a distance-to-target measurement can ultimately be computed.

3. The surveying instrument of claim 1, wherein:

said measurement of said count of said number of cycles of said reference frequency output is time-tagged and stored for later retrieval to construct a time-ordered log, and said precision time standards obtained from orbiting navigation-satellite transmissions are similarly time-tagged and stored for later retrieval to further construct said time-ordered log, wherein a series of distance-to-target measurement can be computed according to the order they were originally collected in the field by the EDM.

4. The surveying instrument of claim 1, further comprising:

a theodolite with a telescope connected to an angle measurement instrument mechanism that together can automatically locate said distant target and determine an elevation and an azimuth to said distant target;

a navigation computer disposed within the satellite navigation receiver and connected to receive a target-position seed value related to said distant target; and a servo actuator connected to mechanically manipulate the theodolite in azimuth and elevation;

wherein, the navigation computer is connected to the servo actuator and provides a signal that will preposition the theodolite; and wherein, the phase measurement device automatically provides a target range measurement to a user at said distance target; and the theodolite automatically provides a vector angle measurement to said user to said distant target.

5. The surveying instrument of claim 4, wherein:

the satellite navigation receiver is remotely located and communicates via a radio link to the reference oscillator to be adjusted and maintained by a plurality of navigation satellite transmissions received by the satellite navigation receiver.

6. A surveying instrument, comprising:

a broadcast time-standard radio receiver for receiving WwV-like broadcast time-standard transmissions;

a reference oscillator with a reference frequency output that is related to a precision-time standard decoded from a broadcast time-standard transmission demodulated by the radio receiver;

an electronic distance meter (EDM) having an EDM-transmitter for launching an out-bound signal to a distant target and an EDM-receiver for receiving a reflected signal from said distant target; and a phase measurement device connected to the reference oscillator and to both said EDM-transmitter and EDM-receiver and providing for a measurement of the difference in the number of cycles of said reference frequency between said out-bound signal and said reflected signal.

* * * * *